United States Patent [19]

Shogren

[11] Patent Number: 4,937,612

[45] Date of Patent: Jun. 26, 1990

[54] OPTICAL SCANNING SYSTEM FOR DUPLEX COPYING

[75] Inventor: David K. Shogren, Ontario, N.Y.

[73] Assignee: Xerox Corporation, Stamford, Conn.

[21] Appl. No.: 391,770

[22] Filed: Jul. 10, 1989

[51] Int. Cl.[5] .................... G03B 27/32; G03B 27/52

[52] U.S. Cl. .................... 355/24; 355/26; 355/235

[58] Field of Search .................... 355/23, 24, 25, 26, 355/50, 235

[56] References Cited

U.S. PATENT DOCUMENTS 4,111,547 9/1978 Stemmle .................... 355/24
4,415,259 11/1983 Satomi .................... 355/235
4,757,353 7/1988 Garofalo .................... 355/14

OTHER PUBLICATIONS

Xerox Disclosure Journal, vol. 10, No. 1, Jan./Feb. 1985.

*Primary Examiner*—Monroe H. Hayes

[57] ABSTRACT

An optical scanning system is provided which enables a simplex to duplex copying operation without requiring the original documents to be oriented in opposite directions at the exposure station. The invention comprises a first imaging system which accomplished a scan of the first document in a first direction (e.g. left to right). At the end of the first scan of the first document, a second document is scanned in the reverse direction by a second, relay lens system which, in one embodiment, is moved into the optical path to replace the first lens. An optical reversion is thus accomplished which permits the duplex operation to be accomplished and images of the first and second documents to be formed in proper orientation on the output duplex copies.

8 Claims, 3 Drawing Sheets

OPTICAL SCANNING SYSTEM FOR DUPLEX COPYING

BACKGROUND AND PRIOR ART STATEMENT

This invention relates to an optical scanning system which provides bi-directional scan capabilities in a simplex and dulplex mode of operation.

It is known in the prior copying art to provide document handling systems in conjunction with duplex copying capabilities. U.S. Pat. No. 4,111,547 describes various types of duplex copying modes. In duplex/duplex copying, both sides of the ducument sheet are copied onto both sides of a copy sheet. In duplex/simplex copying, both sides of the ducument with images on both sides are copied onto one side of two successive copy sheets. In simplex/duplex copying, one side of two successive documents are placed on opposite sides of a copy sheet. The present invention is directed towards a scanning system which is particularly suited for a simplex/duplex copying mode.

A common problem in prior art systems which use a document scanning mechanism in conjunction with a through lens and a simplex/duplex mode is that the originals to be copied in the landscape mode (short edge feed) have the second side copied upside down when introduced into the illumination/exposure area on the platen in the same orientation. In a typical prior art system in which such a short edge fed document is scanned from left to right and an image projected through a lens onto the photoreceptor surface, in order for the developed latent images of successive documents to be transferred and formed right side up on both sides of the copy sheet, the second document to be copied must be oriented in a direction opposite to the first document. Stated another way, the reversion of every other original is required in a simplex/duplex copying mode, reversion defined as rotating the document 180° in its plane, end to end. This reversion has been accomplished in the prior art either manually or by a semi-automatic mechanism, for example, of the type described in Xerox Disclosure Journal Publication "Separation and Sequencing to Achieve Reversion", Volume 10, Number 1, published Jan. /Feb. 1985. It would be desirable to feed all input documents into an exposure station with the input documents having the same orientation. The present invention is, therefore, directed to an optical system which accomplishes reversion utilizing a unique optical scanning system. More particularly, the invention is directed toward a bi-directional scanning system for enabling a duplex copying for original documents including; means for automatically conveying original documents in like orientation, onto an object plane; optical scanning means for incrementally illuminating said object in a first and second direction, and first and second projection lenses associated with said first and second scan direction, said lenses introduced onto the optical path coincide with the initiation of the associated scan cycle.

The invention can also be used to copy landscape oriented documents in a long edge feed mode so as to increase throughput or decrease paper path length.

DESCRIPTION OF THE INVENTION

Figure 1:
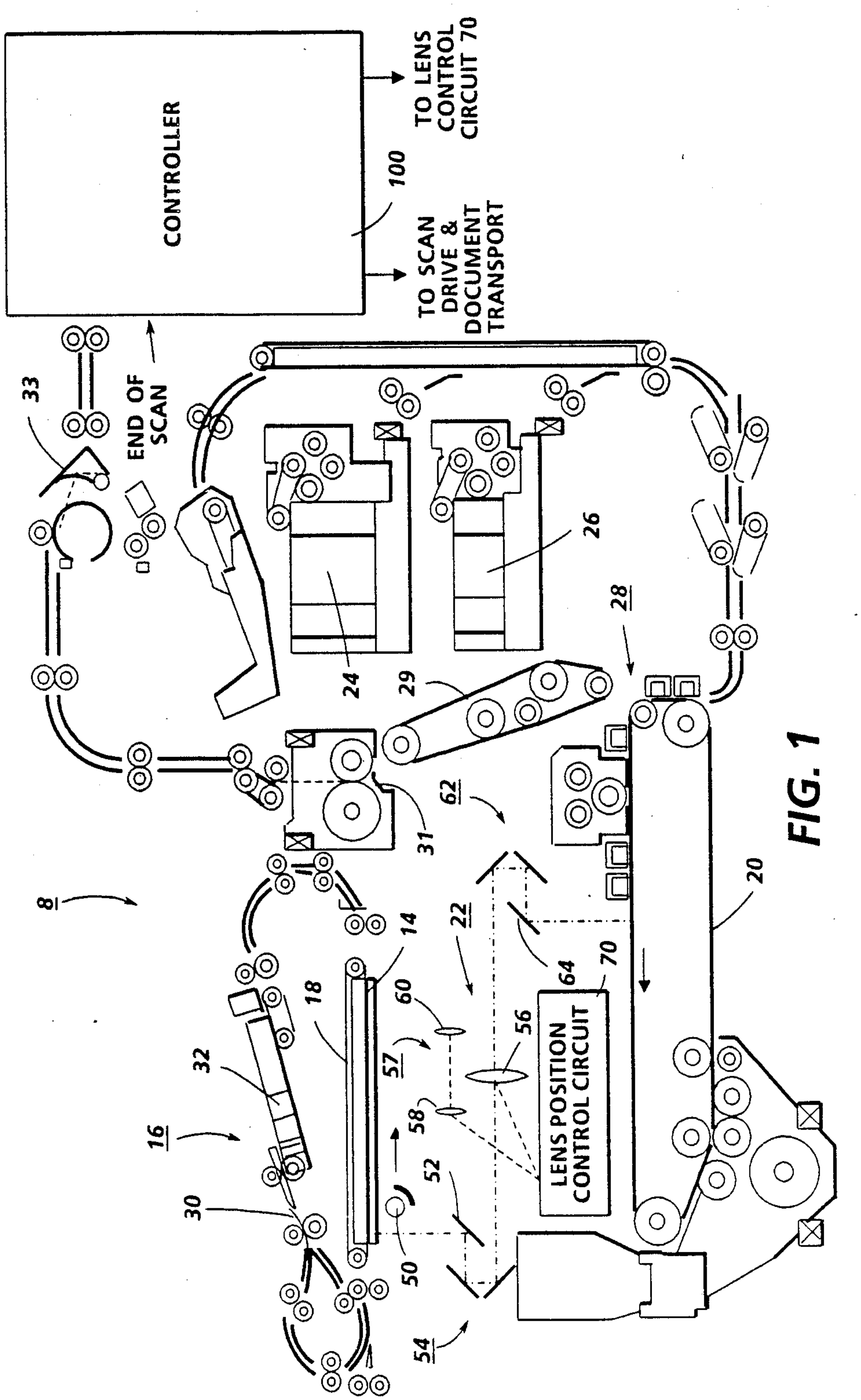
FIG. 1 is a side schematic view of one example of the optical scanning system of the present invention incorporated into a xerographic copying apparatus.

FIG. 1 shows a xerographic copier 8 adapted to provide either duplex or simplex collated copy sets from simplex original documents conveyed to a surface of a platen 14 by a document handler system 16 operating in conjunction with the platen transport system 18. The copier 8 conventionally includes a xerographic photoreceptor belt 20 and xerogrphic stations acting thereon for, respectively, corona charging, image developing, image transfer and precleaning discharge following belt driving. Documents on the platen are imaged onto photoreceptor 20 by optical imaging system 22 described in further detail below.

The control of all machine functions is, conventionally, by the machine controller 100. The controller 100 is preferably a known programmable microprocessor. The controller 100 conventionally controls all of the machine steps and functions described herein, and others, including the operation of the document feeder 16 and document transport 18, all the document and copy sheet deflectors or gates, the sheet feeder drives, etc. The copier controller also conventionally provides for storage and comparsion of the counts of the copy sheets, the number of documents recirculated in a document set, the desired number of copy sets and other selections and controls by the operation through the console or other panel of switched connected to the controller, etc. The controller is also programmed to respond to an operator's selection of a simplex/duplex operating mode to change the position and scanning operation of the optical components in the optical imaging system as will be seen.

The copier 8 is adapted to provide either duplex or simplex collated copy sets from either duplex of simplex original documents presented by the documents handler. Two separate copy sheet trays 24, 26 are prvided for feeding clean copy sheets from either one selectably. The copy sheets are fed from these two selected one of the trays to a transfer station 28 for the conventional transfer of the xerographic toner image of the document images from the photoreceptor to the first side of a copy sheet. The copy sheets are then fed by a vacuum transport 29 to a roll fuser 36 for the fusing of that toner image thereon. From the fuser, the copy sheets are fed through a sheet decurler. The copy sheets then turn a 90° corner path in the sheet path which inverts the copy sheets into a lastprinted face-up orientation before reaching a pivotal decision gate 33. The image side which has just been transferred and fused is face-up at this point. If this gate is down it passes the sheets directly on with out inversion into the output path of the copier. If the gate is up it deflects the sheets into a duplex inverting transport. The inverting transport (roller) inverts and then stacks copy sheets to the duplexed in a deplex buffer tray. The duplex tray provides intermediate or buffer storage for those copy sheets which have been printed on one side and on which it is desired to subsequently print an image or images on the opposite side thereof, i.e. copy sheets in the process of being duplex.

Futher details of an exemplemary document handling system may be found in U.S. Pat. No. 4,757,356 whose contents are hereby incorporated by reference.

Figure 2A:
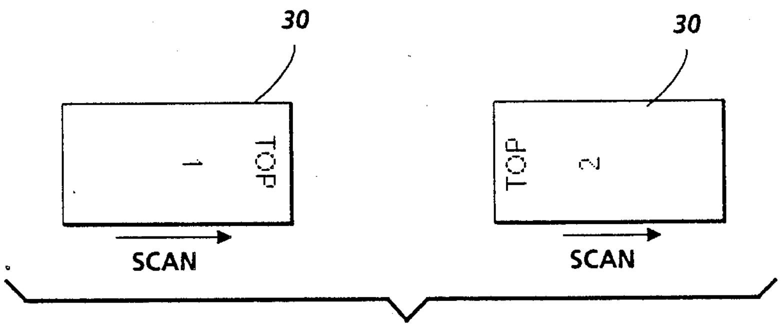
FIG. 2 is a representation of the conventional orientation of documents conveyed to a exposure zone (2*a*) compared with document orientation made possible with the present invention (2*b*).
Figure 2B:
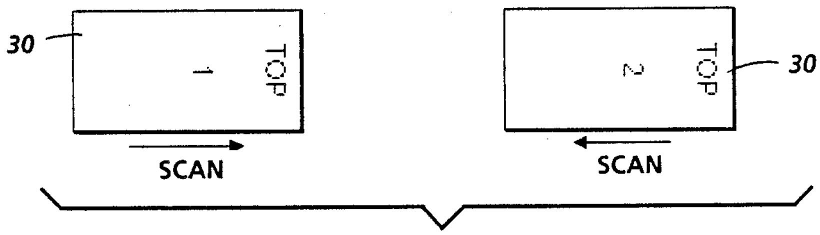
Figure 4:
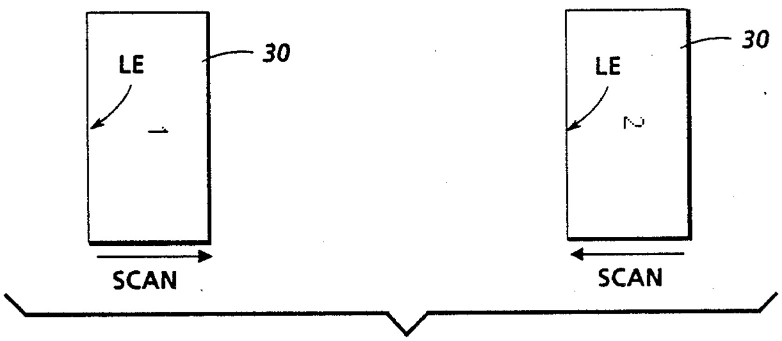
FIG. 4 shows two landscape documents oriented for long edge feed.

Referring still to FIG. 1, platen transport system 18 sequentially transports document sheets 30, loaded into input stacking tray 32, onto and over conventional platen 14. The transport system 18 is also adapted to automatically register each document sheet 30 at an appropriate registration position on the platen 14 such as at a corner or left and rear edge registration. Registration is provided by an integral registration system for engaging, stopping and deskewing, without damage, the lead edge of each document edge sheet 30 at the appropriate registration position on the platen 14. According to a first aspect of the present invention, and assuming a simplex/duplex copying job has been selected, documents 30 may be loaded onto tray 32 so as to have a common orientation. FIG. 2A shows the conventional orientation required in a simplex/duplex edge mode, e.g. alternate documents are inverted or rotated 180° in its plane end to end in order to provide the same orientation on the output sheet. As shown in FIG. 2B, the novel scanning system of the present invention permits short edge feed documents 30 to be oriented in the same direction. Instead of the documents being alternately reverted, the reversion is accomplished optically by imaging system 22.

Figure 3A:
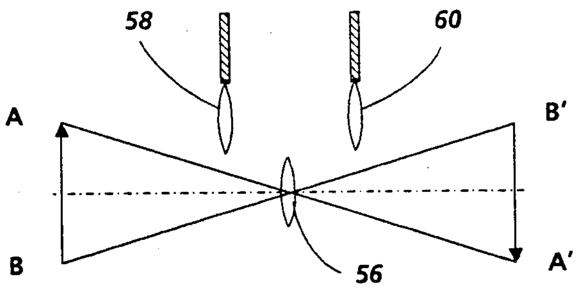
FIG. 3 is a schematic side view of the lens positions during scan of (FIG. 3A) and rescan (FIG. 3B).
Figure 3B:
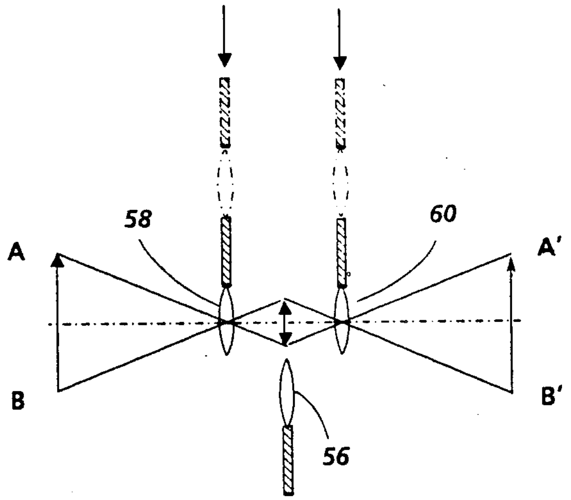

Turning now to a consideration of imaging system 22 shown in FIG. 1, the imaging system comprises an illuminating lamp 50, a first scan mirror 52 moving with the lamp, a second corner mirror assembly 54 moving at one half the rate of mirror 52 and in the same direction; a projection lens 56 and a separate lens relay system 57 comprising projection lenses 58 and 60. Mirror assembly 62 and belt mirror 64, on the image side of the lens, fold the projected image and direct the image to the charged belt surface to form the latent image of the document. According to the invention, lens 56 and lens relay system 57, are translated into and out of the optical path by an electromechanical mechanism embodied in the lens position control circuit 70 and in response to signals from controller 100. In the orientation shown in FIG. 1, and FIG. 3A, and at the start of scan-up operation when a simple/duplex mode is selected, lens 56 is in the optical path and lens 58, 60 are out of the optical path. A first document is moved onto the platen and registered by the document transport system 18. This document is scanned left to right by the optical scanning system (lamp 50, scan mirrors 52, 54) and a flowing image is projected by lens 56 onto the charged surface of the belt to form an image of the first document. At the end of scan operation for the first document, an end of scan signal is sent to controller 100. This signal can be generated optically by an end of scan sensor or by a timing circuit which generates a signal after a predetermined time interval. Controller 100 upon receipt of an end of scan signal, sends a signal to lens control circuit 70 which moves lens 56 out of the optical path and translates lenses 58, 60 into the optical path (FIG. 3B). The controller then activates the document transport mechanism to move the first document out of the exposure zone and move the second document, having like orientation as the first document, onto the platen. An additional signal is generated by the controller causing the scanning components to scan the second document in a right to left direction. The projection of the image onto the belt surface is now inverted 180° with respect to the image projected when lens 56 was in the optical path. FIGS. 3A, 3B show this inversion in schematic form with the line A–B representing an object plane and A'–B' representing the line orientated at the image plane. The first latent image of the first document formed on the belt surface is developed and transferred to one side of a copy sheet, fused and returned to the transfer area where the developed image of the second document is transferred to the second side of the copy sheet. The second side is then fixed and the copy sheet delivered to an output tray. The images on each side of the copy sheet have the same orientation due to the inversion accomplished by the lens relay system of lens 58 and 60. Additional duplex copies of successive original simplex documents are formed in this manner described above with the bi-directional scan and an alternate lens placement repeated successively.

Figure 5:
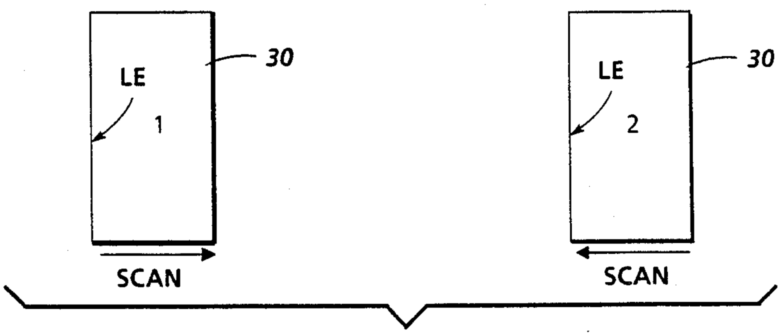
FIG. 5 shows two portrait documents oriented for long edge feed.
Figure 6:
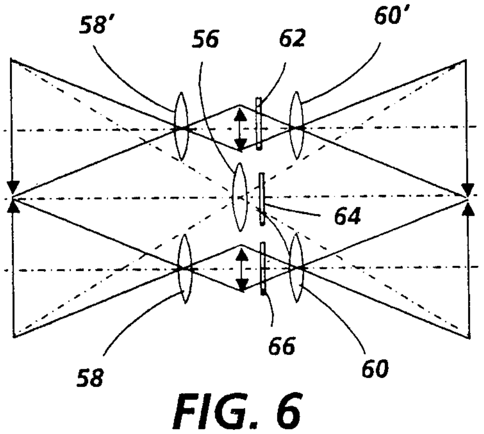
FIG. 6 is a side view of a second embodiment of the optical scanning system of the present invention.

The invention is also applicable to simplex/duplex copies of landscape originals fed in the long edge mode. The orientation of such originals and the scan direction is shown in FIG. 5. FIG. 6 demonstrates a still further potential use of the inverse scan system wherein a portrait original in a long edge feed mode has the second side orientation changed on purpose so that the output copies are oriented for binding along the top (short) edge.

FIG. 6 shows an alternate projection lens arrangement consistent with the principles of the invention. Here two inversion lens sets 58, 60 and 58', 60' are fixedly positioned and shutters 62, 64 and 66 are moved to effectively select whichever lens groupings are to be active; e.g., for the left to right scan, shutter 64 is moved out of the optical path; shutters 62, 66 stay in blocking position. On the right to left scan, shutter 64 is in the blocking position, and shutters 62, 66 are moved out of the optical path. Two relay lens sets are required to capture the entire field of view. The shutter moving mechanism can be any type of simple motor arrangement as known in the art.

While the invention has been described with reference to the structure disclosed, it is not confined to the specific details set forth, but is intended to cover other modifications and changes as may come within the spirit and scope of the following claims:

I claim:

1. A bi-directional scanning system for enabling a duplex copying of original documents including; means for automatically conveying original documents, in like orientation, onto an object plane; optical scanning means for incrementally illuminating said object plane in a first and second direction, and first and second image projection means associated with said first and second scan direction, said projection means introduced into the optical path to coincide with the initiation of the associated scan cycle.

2. The scanning system of claim 1 wherein said first projection means is a projection lens and said second projection means comprises a pair of lenses arranged to form a relay lens system whereby an image is inverted by a first lens and reinverted by a second lens, said projection lens associated with said first scan and said second projection means associated with said second scan.

3. The scanning system of claim 2, wherein a first document is scanned in a first direction and an image projected along the optical path by said first projection lens and wherein a second document is scanned in a reverse scan direction by said relay lens system.

4. The scanning system of claim 1, wherein said first projection means is a projection lens fixedly positioned along the optical path, and wherein said second projection means comprises a two set relay lens fixedly positioned above and below the optical path, said system further including shutters associated with the projection lens and the relay lens set, the shutters being movably positioned so as to enable a first scanned image to be projected by said single projection lens, and a second scanned image to be projected by said relay lens set in a reverse scan direction.

5. The scanning system of claim 1, wherein said original documents are introduced to said object plane in a short edge feed mode.

6. In a automatic document handling system for making duplex copies of simplex original documents, a document scanning system comprising, in combination, means for successively transporting original documents in the same image orientation onto the surface of a document platen, means for incrementally illuminating and scanning a first document in a first scan direction using a first projection lens system, and means for substituting for said first projection lens a second relay lens assembly and means to move said scanning means in a reverse direction whereby said second document is scanned and an inverted image formed.

7. In a copying apparatus wherein simplex documents are successively exposed and imaged onto a photosensitive surface said copier having a capability of developing said images and transferring them to copy sheets to form duplex ouput copies, a document scanning system comprising imaging means for incrementally scan/illuminating a first document in a first scan direction and for projecting an image, by a first lens system, of the first document onto the photosensitive surface forming a latent image with a first orientation, said imaging means adapted to scan a second document in a reverse scan direction with a second lens system to form a latent image at the photosensitive surface with an orientation inverse to that of the first latent image.

8. The copying apparatus of claim 4 wherein said second lens system comprises a first and second lens element forming a lens relay system.

* * * * *